Figure 1:
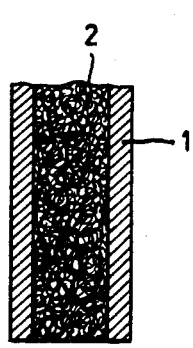

Nov. 17, 1964  H. J. M. VAN EMBDEN  3,157,143
SOLDER TIP
Filed Sept. 14, 1960

2 (copper with metallic wire)

INVENTOR.
HENDRIK J. M. VAN EMBDEN
BY
AGENT

3,157,143
SOLDER TIP
Hendrik Johannes Meerkamp van Embden, Eindhoven, Netherlands, assignor to North American Philips Company, Inc., New York, N.Y., a corporation of Delaware
Filed Sept. 14, 1960, Ser. No. 55,973
Claims priority, application Netherlands Sept. 18, 1959
5 Claims. (Cl. 113—111)

My invention relates to soldering irons and particularly to copper tips used in connection therewith, and to a method of making the same.

The copper tips used for soldering have the disadvantage that they are liable to dissolve in the liquid solder or to take up the same. As a result the tip, or at least the end thereof, becomes comparatively soft, and thus is easily deformed by any mechanical force exerted thereon during the soldering. This difficulty is particularly prevalent when it becomes necessary to rub the tip on the metal to be soldered in order to make the solder adhere to the metal. This occurs, for instance, in soldering to aluminum having an aluminum oxide surface coating to which the solder noes not readily adhere. By scratching or rubbing the aluminum with the soldering tip the oxide layer is removed and the soldering can be readily carried out without the possibility of the aluminum oxidizing again. However, as stated above, this rubbing deforms the soldering tip and greatly reduces the life thereof. In addition the smooth surface of the soldering tip makes it difficult to remove the oxide layer by rubbing the tip on the metal.

In accordance with the invention the above disadvantages are overcome by distributing within the copper of the soldering tip a quantity of wire formed of a metallic material, i.e. a metal or alloy, which has a melting point above that of copper, for instance about 1200° C., and higher and which is substantially insoluble in molten copper. Molybdenum and tungsten and alloys thereof are particularly suitable for this purpose.

The metallic wire, which may be of various cross-sections and thicknesses of usually between about $20\mu$ to $150\mu$, is arranged in the copper so that the ends thereof will project slightly from the active surface of the tip. This may be effected by means of arranging the wire at random, but I have found that the best results are obtained when the wire extends mainly in a direction perpendicular to the active surface of, or in the axial direction of, the soldering tip.

The ends of the metallic wire, which project slightly from the active surface of the tip, make it easy to scratch the metal to be soldered through the fluid solder, and also through an intermediate layer, such as a layer of aluminum oxide, so that the solder will readily adhere to the metal. The copper tip with the metallic wire therein will not be softened at all, or only to a very slight extent, due to the heat, solder and mechanical forces applied, with the result, that the tip will have a long life.

In accordance with the method of the invention the soldering tips are formed by filling a metal tube with a mass of the metallic wire and then filling the remaining spaces with molten copper by capillary action. The cooled filled tube is then reduced in diameter by elongating it for instance by hammering or drawing, so as to arrange the filaments in the axial direction after which desired lengths of the tube are cut off to form the tips.

Figure 2:
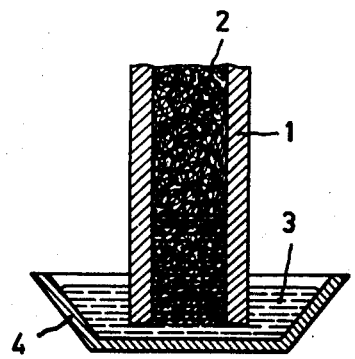
Figure 3:
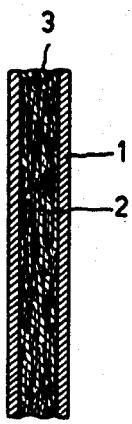
Figure 4:
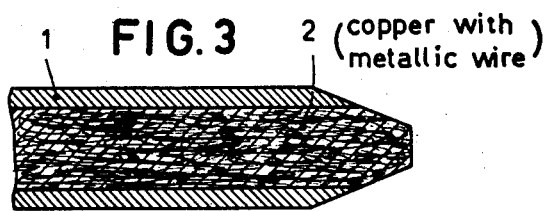

In order that the invention may be clearly understood and readily carried into effect we shall describe the same in more detail with reference to the accompanying drawing in which FIGURE 1 is a sectional view of a metal tube filled with a mass of wire, FIG. 2 is a section view of the tube of FIGURE 1 at one stage of the method of the invention, FIG. 3 is a section view of a tube from which soldering tips are made, and FIG. 4 is a sectional side view of a soldering tip according to the invention.

As shown in FIGURE 1, a tube 1 of a metal which is only slightly attacked by solder, for instance stainless steel, and which has an outside diameter of about 16 mm. and an inside diameter of about 13 mm., is filled with a mass of tungsten or molybdenum wire having a thickness of about 40 microns and arranged at random. As shown in FIG. 2, the end of the filled tube of FIGURE 1 is then immersed in a pool of molten copper 3 contained in a basin 4 so that the molten copper will rise by capillary action up into the tube 1 and fill the voids in the wire mass 2. After being cooled, the tube 1 with the copper-metal wire mass therein is reduced in diameter, for example from about 16 mm. to 8 mm., for instance by hammering or a drawing operation, to thereby obtain the structure shown in FIG. 3 in which metallic wire 2 is arranged in a general axial direction. The tube of FIG. 3 is then cut into desired lengths to form soldering tips, and because of its axial arrangement the metallic wire 2 will in general extend generally perpendicularly to the surfaces of the tips.

The thickness of the tungsten and molybdenum wire may be between about $20\mu$ to $150\mu$, but I have found that excellent results are obtained with wire having a thickness between 40 and 80 microns. As to the amount of the metallic wire used, I have found that in general the ratio between the weight of the copper and the wire should lie between about 3:7, and 4:1, and that good results are obtained when using copper and tungsten or molybdenum in a ratio of about 1:1.

Tips cut from the filled tube shown in FIG. 3 may be used without removing the envelope 1, for example in automatic soldering in which the bit is rotated around its axis. However in other cases the surrounding tube may be at least partly removed. For example, a soldering tip such as shown in FIG. 4, which is suitable for use with the usual hand electric soldering irons, is formed by cutting a piece from the filled tube of FIG. 3 and machining the same to form the conical-shaped tip. In some cases it is desirable to remove all of the tube 1.

While I have described my invention in connection with special examples and particularly materials, I do not desire to be limited thereto as obvious modifications will readily present themselves to one skilled in this art.

What is claimed is:

1. A soldering tip having at one end an active surface adapted to be rubbed against the surface of a metal workpiece, said tip comprising an elongated cylindrical body consisting of a hollow metal tube filled with a coherent mass of wire embedded in copper, said wire being abrasive, substantially insoluble in molten copper and having a melting point of at least about 1200° C., the ends of said mass of wire extending through said active surface so as to make said surface abrasive.

2. A soldering tip as defined in claim 1 in which the wire extends substantially perpendicularly through the active surface.

3. A soldering tip as claimed in claim 1 in which the wire is tungsten.

4. A soldering tip as claimed in claim 1 in which the wire is molybdenum.

5. A soldering tip as claimed in claim 1 in which the wire is between about 40 and 80 microns thick and has a weight ratio of about 1:1 to the copper.

(References on following page)

References Cited in the file of this patent

UNITED STATES PATENTS

| | | | |
|---|---|---|---|
| 120,166 | Reynolds et al. | Oct. 24, | 1871 |
| 226,066 | Hart | Mar. 30, | 1880 |
| 246,570 | Stewart | Aug. 30, | 1881 |
| 604,569 | Ringstrom | May 24, | 1898 |
| 918,069 | Marius | Apr. 13, | 1909 |
| 1,238,671 | Holcomb | Aug. 28, | 1917 |
| 1,552,184 | Adams | Sept. 1, | 1925 |
| 1,760,519 | Palmer | May 27, | 1930 |
| 2,140,910 | Hensel et al. | Dec. 20, | 1938 |
| 2,175,899 | Kelly | Oct. 10, | 1939 |
| 2,324,802 | Powell | July 20, | 1943 |
| 2,707,324 | Walther | May 3, | 1955 |
| 2,791,669 | Ferrara | May 7, | 1957 |
| 2,849,312 | Peterman | Aug. 26, | 1958 |
| 2,974,369 | Orthuber et al. | Mar. 14, | 1961 |